Figure 3:
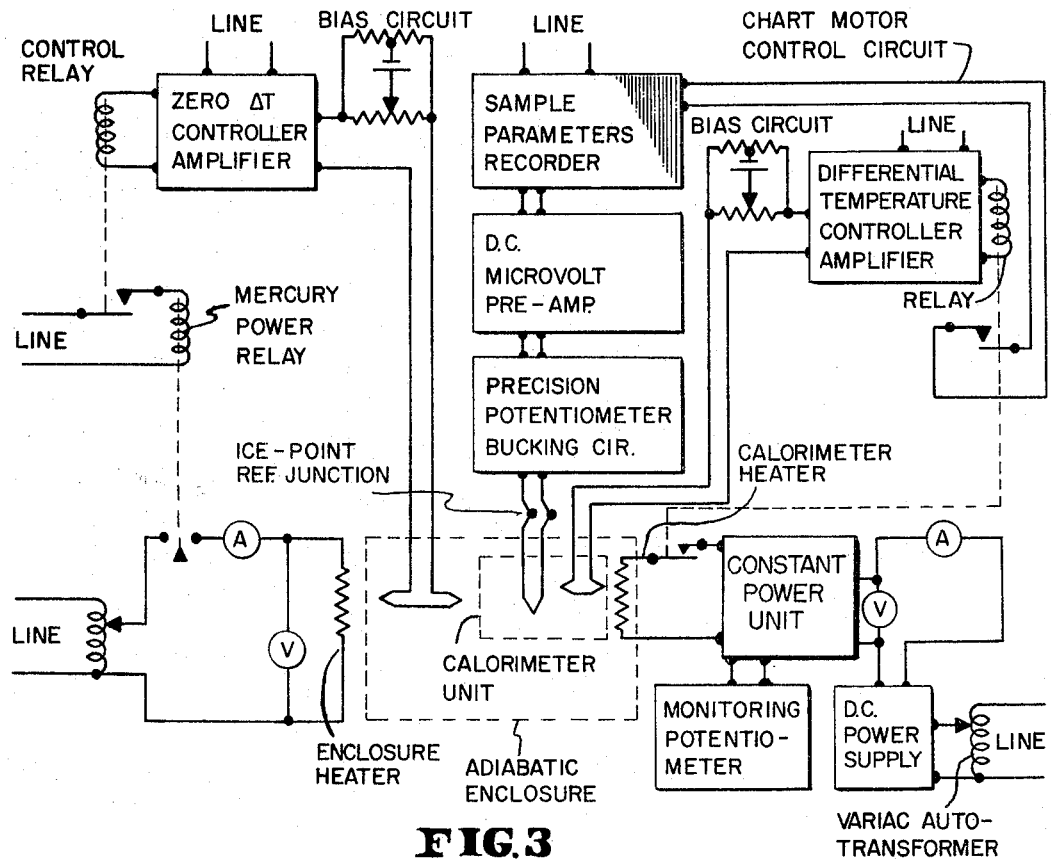

Aug. 23, 1966   C. SOLOMONS   3,267,728
DYNAMIC AUTOMATICALLY CONTROLLED CALORIMETER
AND MELTING POINT DEVICE
Filed Aug. 25, 1964   2 Sheets-Sheet 1
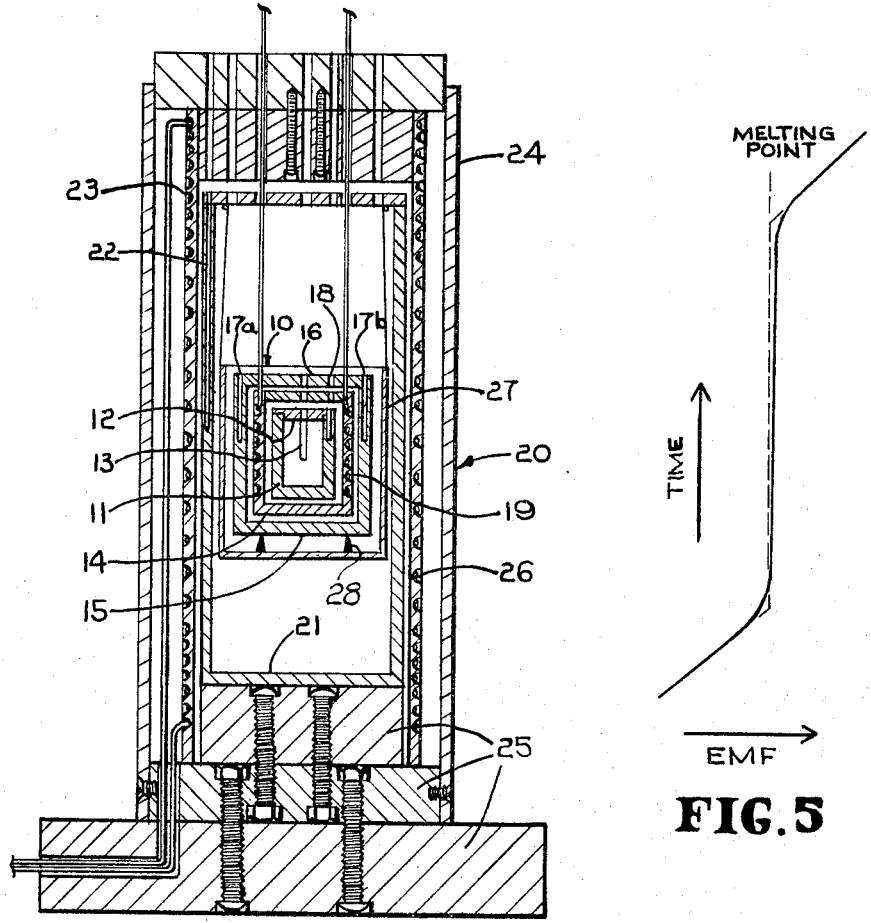
FIG.1
FIG.5
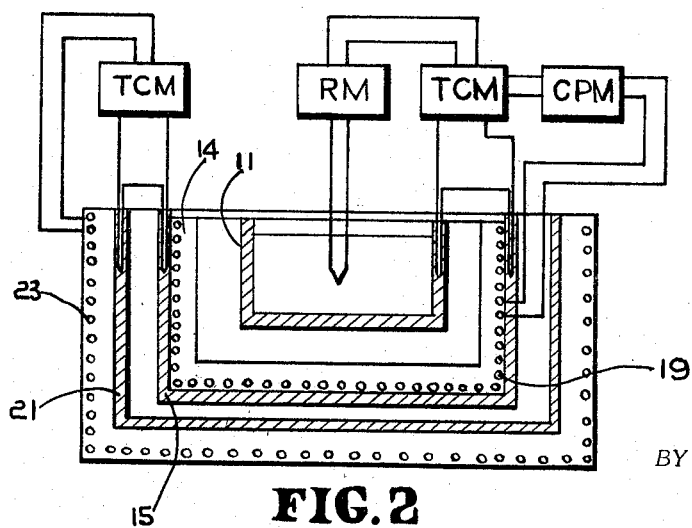
FIG.2
INVENTOR.
CYRIL SOLOMONS
BY
Robert J. Vidas
ATTORNEY

INVENTOR.
CYRIL SOLOMONS 3,267,728
DYNAMIC AUTOMATICALLY CONTROLLED CALORIMETER AND MELTING POINT DEVICE
Cyril Solomons, Edina, Minn., assignor to Honeywell Inc., Minneapolis, Minn., a corporation of Delaware
Filed Aug. 25, 1964, Ser. No. 391,929
6 Claims. (Cl. 73—190)

This invention is related to an improved calorimetric apparatus which is particularly adapted to the rapid, accurate determination of the amounts of heat involved in endothermic reactions such as those involved in the measurement of heats of fusion, specific heats and latent heats of various materials.

Many of the prior art calorimeters have been found to be either lacking in accuracy due to extremely simple construction or highly accurate but of extremely complex design. In either case, to obtain data from these prior art devices is extremely time consuming. On the other hand, the calorimeter system of this invention is simple to construct and is capable of yielding data with better than ±2% accuracy. Furthermore, a system in accordance with this invention is also capable of automatically recording the energy-temperature plot for a sample on a conventional strip chart recorder. From such a plot, the heat involved in an endothermic reaction may be rapidly determined.

The calorimeter assembly is one in which the sample is heated electrically, through its melting point for example, while a temperature control means maintains a constant temperature difference between the heat source and sample. A second temperature control means maintains adiabatic conditions between the calorimeter proper and its environment thus isolating it thermally. When the temperature is changing, the difference in the heats required when the sample is present and when it is absent is, therefore, the heat absorbed by the sample. When the temperature of the system is steady, as at a phase change, the heat absorbed when the sample is present is used only to change the state of the sample.

The calorimeter assembly consists generally of three concentric cylinders or containers. An inner thermal barrier is provided between the innermost cylinder and the middle cylinder. An outer thermal barrier is provided between the outermost cylinder and the middle cylinder. The sample is placed in the innermost container. A heater is placed in thermal contact with the middle container. The outermost container is also heated. In operation, a first temperature control means maintains, with the aid of a thermocouple, a constant temperature difference between opposite sides of the inner thermal barrier, that is between the heater and sample. The rate of heat flow through this barrier into the sample is thus a constant rate. A simple electrical circuit controlled by the first temperature control means supplies constant power to the heater. A second temperature control means maintains the temperature of the outermost container at a level which is the same as that of the middle container. Thus, the innermost container and sample are thermally isolated from the surrounding environment.

It is an object of this invention to provide a calorimetric apparatus capable of highly accurate, rapid determinations.

It is another object to provide a relatively simple calorimetric apparatus which is easy to build and use.

It is a further object of this invention to provide a calorimetric apparatus which is capable of automatically recording pertinent data to simplify the heretofore complicated determinations involved in the calorimetric analysis of endothermic reactions.

It is still another object of this invention to provide a calorimeter which is constructed of several concentric containers thus furnishing both adiabatic isolation and dynamic heat flow conditions for the calorimetric analysis of endothermic reactions.

Figure 4:
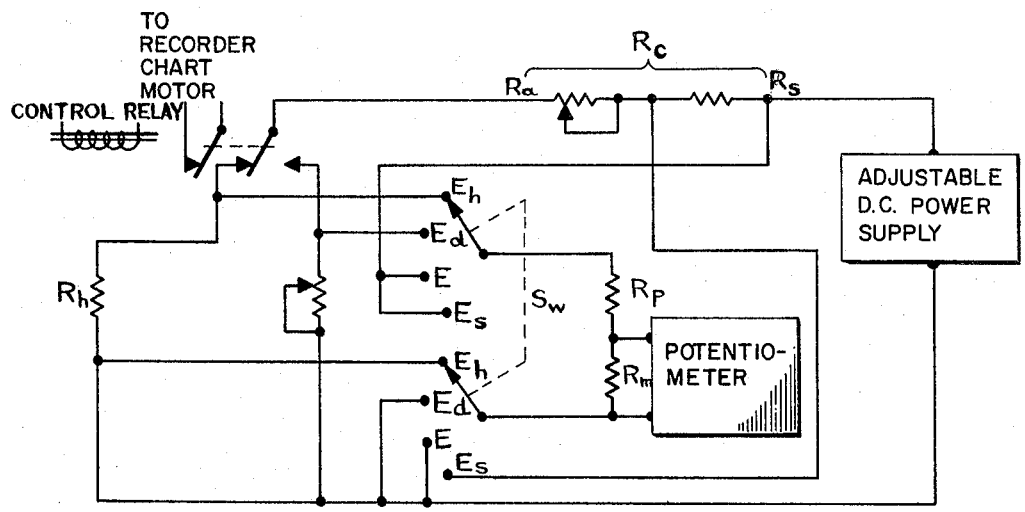

With these and other objects in view:
FIGURE 1 is a sectional drawing of the calorimeter assembly of the present invention.
FIGURE 2 is a schematic representation of the calorimeter system in accordance with the present invention.
FIGURE 3 is a block diagram of the controlling and measuring circuits utilized in the calorimeter system.
FIGURE 4 is a more detailed electrical diagram of the constant power unit utilized in the electric circuit shown in FIGURE 3.
FIGURE 5 is a typical time-temperature plot ("calorogram") for the fusion of benzoic acid obtained with a calorimeter in accordance with the present invention.

*The calorimeter*

The details of the calorimeter and the adiabatic enclosure, which when taken together form the calorimeter assembly, are shown in FIGURE 1 wherein the calorimeter proper is generally designated as 10 while the adiabatic enclosure is generally designated as 20. Calorimeter 10 is comprised of a sample container 11 which may be a cylindrical container of a metal such as steel or aluminum, both of which have been found to be satisfactory materials. Container 11 is shown fitted with a cover 12 which includes thermocouple shield 13. Shield 13 is adapted to hold a thermocouple or other suitable temperature sensing means for monitoring the temperature of the sample container 11 and its contents. Sample container 11 is completely enclosed by the calorimeter heater core 14 which also functions as the inner thermal barrier. Container 14 has a winding of resistance wire 19 placed on its outer walls. The preferred material for heater core 14 is lava. Enclosing containers 12 and 14 is an outer case 15 which is a cylindrical metal container fitted with a cover 16. This container together with the heater winding 19 on container 14 acts as source of heat for the endothermic process. Channels 17a, 17b and 18 are adapted to contain thermocouples or other temperature sensing means which will be further described hereinbelow. Finally, enclosing calorimeter 10 is a stainless steel heat shield 27 which also takes the form of a closed cylindrical container. More than one heat shield may be used as desired. Outer case 15 is supported in heat shield 27 by means of several pins shown as 28. From the drawing it can be seen that containers 11, 14, 15 and heat shield 27 are preferably arranged concentrically. These containers may be in actual contact with each other or they may be separated as shown with the space between filled with metal wool. Calorimeter 10 and heat shield 27 are suspended within the adiabatic enclosure 20 by means of three fine wires. The heat shield 27 and the air gap between container 15 and enclosure 20 comprise an outer thermal barrier.

The remainder of the calorimeter assembly is comprised of the adiabatic enclosure 20 which includes a cylindrical heat distributor 21 made of a material such as steel or aluminum. Channel 22 in the wall of heat distributor 21 is adapted to contain a thermocouple or other temperature sensing means. Enclosing heat distributor 21 is furnace core 23 which is cylindrical in shape. Core 21 is made of a thermal insulator material such as lava or alumina and contains in its outer wall a winding of resistance wire 26 as shown. Finally, an outercase 24 preferably of asbestos cement or other thermally insulating material encloses the entire unit and is supported on base 25 of suitable material which may be a composite bolted together as shown.

Operation

The calorimeter assembly is one in which the sample is heated electrically, say through its melting point, while a differential temperature controller maintains a constant temperature difference across a thermal barrier between heat source and sample. A second differential controller maintains adiabatic conditions across a second thermal barrier between the calorimeter proper and its environment. When the temperature is changing, the difference in the heats required when the sample is present and when it is absent is, therefore, the heat absorbed by the sample.

Plots of heat absorbed by this system, with and without the sample, against temperature thus give information on the specific heat and latent heat properties of the sample; the apparatus of the present invention is so designed that these plots can be recorded directly in terms of the thermal energy absorbed by the sample.

To achieve this aim, a differential temperature controller system maintains, with the aid of a thermocouple whose junctions are on opposite sides of a thermal barrier between the heater and the sample, a constant temperature difference across this barrier. The rate of heat-flow through this barrier and into the sample is thus maintained at a constant value. A simple electrical circuit controlled by the differential controller supplies constant power direct current in an on-off fashion to the heater. The sum of all of the time intervals for which the power is applied multiplied by the value of the constant power is therefore the total energy supplied.

$$\text{energy} = \text{power} \Sigma (\text{time})$$

By recording the sample temperature on a strip chart recorder whose chart drive motor is switched on and off simultaneously with the power, the length of the chart record is automatically a direct measurement of $\Sigma(\text{time})$. From two such plots, made with the calorimeter empty and with the sample in place, specific heat data can be readily derived. From only one such plot, made with the sample in place, latent heat measurements may be made directly.

The manner in which the apparatus programs the heat flow so as to achieve the results stated above, is as follows: Initially the furnace, the calorimeter, and the sample are all at temperature $T_1$. The calorimeter controller is now set to maintain a potential difference between its junctions, with the outer junction hotter than the inner one. Power will therefore be supplied to the calorimeter heater to produce this difference. The temperature of the calorimeter will rise above that of the sample, which will in consequence absorb heat from its surroundings in an attempt to equilibrate. As fast as heat is absorbed by the sample, however, more heat is provided by the calorimeter, and hence the temperature will increase as if programmed to do so even though no programming means as such is involved in the apparatus.

Reference is now made to FIGURE 2 of the drawings in order to explain the operation of the device. A conventional calorimetry equation is $q_h = q_s + q_c + q_1$ or the heat supplied to the system ($q_h$) equals the heat absorbed by the sample ($q_s$) plus the heat absorbed by the calorimeter ($q_c$) plus any heat loss ($q_1$).

The calorimeter in accordance with the present invention eliminates $q_1$ by maintaining adiabatic conditions between the outer cylinder 21 and inner cylinder 15. Also, a constant temperature gradient is maintained between sample container 11 and inner cylinder 15. The equality of temperatures between inner and outer cylinders 15 and 21 respectively forbids heat from passing to the exterior of the calorimeter assembly so that after the inner cylinder 15 temperature reaches its control point, all heat must pass toward the sample contained in container 11. The adiabatic condition and the constant temperature gradient condition are maintained with two feed-back control systems shown in block form in FIGURE 2. A first temperature control means (TCM) is shown between outer container 21 and inner container 15 which includes a differential thermocouple having junctions contacting each of these containers respectively. This first temperature control means maintains the adiabatic condition. A second temperature control means (TCM) is shown between inner cylinder 15 and sample container 11. The second temperature control means also includes a differential thermocouple with junctions contacting inner cylinder 15 and sample container 11 respectively by means of which the constant temperature gradient condition is achieved. A third thermocouple is shown extending into sample container 11. This thermocouple in conjunction with recording means (RM), such as a strip chart recorder, monitors the temperature of the sample. A constant power means (CPM) is shown connected to resistance winding 19. The constant power means is required to maintain the constant temperature gradient condition; this means will be discussed more fully hereinbelow.

By meeting the above described condition, $q_1$ can be ignored and $q_h = q_s + q_c$. If the sample is removed, $q_h = q_c$ and $q_c$ becomes known so that $q_s$ can be determined by a simple subtraction. The only problem remaining is the accurate measurement of $q_h$. The energy $$q_h = \int \text{watts} \times \text{time or} \int \text{amps} \times \text{volts} \times \text{time}$$

However, the integration is difficult without a constant current, voltage or wattage. Thus, the present invention provides for a constant power source.

Control and measurement circuits

As may be seen from the block diagram of FIGURE 3, the controlling and measuring circuits fall naturally into two groups, corresponding to those for the adiabatic enclosure and those for the calorimeter proper.

The adiabatic enclosure control system utilizes a solenoid-operated mercury power relay to handle the heater power. This additional component is not required in the calorimeter heater circuit which is of low power. Simple bias circuits are provided since the point of on-off operation of control circuits of the type used is not zero and since thereby the necessary temperature difference across the inner thermal barrier can be most readily provided for. Also shown in conjunction with the adiabatic enclosure control system is the first temperature control means including a zero differential temperature controller amplifier and a differential thermocouple which maintains adiabatic conditions between the calorimeter proper and its environment.

The power to the calorimeter heater is obtained from a constant-voltage D.C. power supply and feeds a constant power circuitry, termed constant power means herein, which is essentially that disclosed by Rosengren in the Review of Scientific Instruments, volume 32, page 1264. The constant power means is equipped with means for making monitoring and power measurements easily and routinely as is shown in FIGURE 4.

The Rosengren circuit is such that the difference in power dissipated by $R_h$ will be negligible between any two temperatures if $R_c = \sqrt{R_{h1} \times R_{h2}}$ where $R_{h1}$ is resistance at temperature one and $R_{h2}$ is resistance at temperature two, whereas without $R_c$ the power dissipation decreases inversely as $R_h$ increases.

In order to provide an adjustable system to cover different temperature ranges, however, the present invention separates $R_c$ into $R_a$, an adjustable resistor, and $R_s$, a known standard resistance. Then, adding a potentiometer to measure $E_s$ across $R_s$ and $E_h$ across $R_h$, $E_s = R_s I_s$, where $i_s$ is the same as $i_h$ and $R_s$ is known. Thus, watts across $R_h$ can be determined; $E_h E_s / R_s =$ watts of constant power.

With a strip chart recorder measuring the temperature of the sample only when power is demanded, a direct readout of energy supplied during an endothermic process such as fusion is possible. The chart reads time directly between any two points. Therefore, when temperature ceases to climb fusion is taking place and when temperature rises again fushion is completed.

Since $q_h = \int \text{watts} \times \text{time}$, and watts ($E_h E_s / R_s$) is maintained constant, $q_h$ becomes a known factor × time, so that by an easy conversion, time for fusion is in effect, $q_h$, the heat of fusion. By comparing plots with and without the sample, specific heat data are also easily obtained.

The calorimeter differential temperature controller amlifier operates a control relay fitted with two sets of contacts. One of these switches $R_h$ (heater) and $R_d$ ("dummy") in and out of the circuit alternately. The other switches the chart drive motor of the temperature recorder on and off. The distance along the time axis of the chart record thus corresponds directly to the time for which power is applied and is a direct source of information as to the amount of energy involved in an endothermic reaction.

*Tests of performance*

FIGURE 5 shows a typical time-temperature plot ("calorogram") for the fusion of benzoic acid obtained with the calorimeter constructed in accordance with the present invention. The temperature is plotted in terms of E.M.F. to utilize the output of the thermocouple directly.

It will be seen that the recorded trace differs slightly from the plot, shown dotted, for an ideal calorogram. In the first place, slight curvatures occur at the beginning and end of the fusion process. This type of behavior is normal in all forms of time-temperature measurement when a latent-heat process is studied. The amount of curvature is dependent on the rate of heat exchange, and is greater the faster this rate. These departures from ideality are caused at the beginning by the presence of some liquid above the fusion temperature before all the solid is melted; while at the end, the thermocouple is affected more by this liquid than by the small amount of solid still remaining. Secondly, the temperature recorded increases slightly (by a few tenths of a degree) during the fusion process instead of remaining constant at the fusion temperature. This is probably caused by a slight out-of-equilibrium condition between the solid and liquid created by the necessity for melting the solid at a finite rate. Such non-idealities are customary in calorimetric studies, they can be minimized as desired by appropriate experimental adjustment of the rate that heat is supplied to the sample.

It will be readily apparent that discontinuities on the curve will result from latent heat effects, such as the heats associated with fusion, crystal transformation, etc., and the magnitudes of these effects may be derived from this curve. Further, the slope of the curve, when the heat absorbed raises the temperature of the sample, is equal to the specific heat of the given amount of sample used. After appropriate correction for the heat used in raising the temperature of the empty calorimeter, the molar heat contents may be readily computed.

Extrapolation, to the melting point, of the two branches of the calorogram above and below the fusion temperature gives the times at which fusion begins and ends ($t_1$ and $t_2$) with a high degree of accuracy.

TABLE I

| Sample | Wt. of Sample (g.) | Diffl. Temp. (° C.) | ΔH$_f$ exptl. (absolute joule mole) | Error in ΔH$_f$ (percent) |
|---|---|---|---|---|
| 1 | 16.550 | 0.1 | 18 075 | +0.5 |
| 2 | 16.550 | 0.1 | 17 965 | −0.1 |
| 3 | 17.104 | 0.1 | 18 089 | +0.6 |
| 4 | 29.949 | 0.25 | 18 347 | +2.0 |
| 5 | 29.949 | 0.50 | 18 286 | +1.7 |
| | | | Mean 18 152 (4338 thermochemical calories mole$^{-1}$) | +0.94 |

Several experiments were carried out, using benzoic acid of "primary standard" purity (Mallinckrodt) to test the calorimeter of the present invention. Table I summarizes some measurements made and the results. In the last column of Table I, "errors" in ΔH$_f$ are given, as computed from ΔH$_f$ (exptl.) and the value 18,000±100 absolute joule mole$^{-1}$ reported by The National Bureau of Standards. Other values quoted by The National Bureau of Standards are 9,810, 20,260, 17,780, 17,320, 16,760, and 15,530 absolute joule mole$^{-1}$. A small additional error, 0.05% arises from the use of C=12 atomic weight units in the present work, while earlier data are based on O=16. It will be seen that the results obtained by the use of the apparatus prepared in accordance with this invention are closer to the most carefully determined National Bureau of Standards values than most other values. The mean error (1%) is not very large considering that the present apparatus is much simpler than that used at The National Bureau of Standards, both with respect to the calorimeter and with respect to the electronic circuitry involved.

It will be understood that modifications may be made in the design and arrangement of the parts of this invention without departing from the spirit thereof.

I claim:
1. A calorimeter assembly comprising in combination a plurality of closed cylindrical containers arranged one within the other, said combination including:
    a metal sample container
    a first thermocouple mounted in said sample container to monitor the temperature thereof
    a first heater core surrounding said sample container,
    a first metal casing surrounding said heater core
    a metal heat shield surrounding said metal casing
    a second thermocouple mounted in said assembly with the junctions thereof contacting the sample container and said first metal casing to maintain a constant temperature differential therebetween for causing heat to flow from said heater core to said sample container
    a second metal casing
    means suspending said heat shield and its contents within said second metal casing
    a third thermocouple mounted in said assembly with the junctions thereof contacting said first metal casing and said second metal casing to maintain a zero temperature differential therebetween to prevent heat exchange whereby the energy supplied to said first heater core substantially equals the heat supplied to said sample container and the amount of the heat may be determined as a function of time
    a second heater core surrounding said second metal casing, and
    an outer enclosure including a base support means for the entire calorimeter assembly.

2. A calorimeter assembly comprising in combination:
    a calorimeter unit including an outer calorimeter casing, a first heater core with heating element and an inner sample container
    temperature sensing means in said sample container for monitoring the temperature thereof
    first temperature control means for maintaining a constant temperature gradient between said heater core and said sample container
    heat shield means surrounding said calorimeter unit
    an adiabatic enclosure surrounding said heat shield means and said calorimeter unit, said enclosure including a second heating element
    second temperature control means for maintaining a zero temperature differential between said adiabatic enclosure and said calorimeter unit whereby the energy supplied to said first heater core substantially equals the heat supplied to said inner sample container and the amount of the heat may be determined as a function of time, and
    means for mounting said calorimeter unit within said adiabatic enclosure.

3. A calorimeter assembly comprising in combination:
   a calorimeter unit including a sample container and heating means for said sample container
   temperature sensing means in said sample container for monitoring the temperature thereof
   an adiabatic enclosure housing said calorimeter unit
   first temperature control means for maintaining a constant temperature gradient between said heating means and said sample container, and
   second temperature control means for maintaining a zero temperature differential between said adiabatic enclosure and said heating means whereby the energy supplied to said heating means substantially equals the heat supplied to said sample container and the amount of the heat may be determined as a function of time.

4. A calorimeter system comprising:
   at least three concentrically arranged containers the innermost container serving to hold a sample to which heat is supplied
   first thermocouple means in the innermost container for monitoring the temperature thereof
   a first electrical heating element surrounding the middle container
   a second electrical heating element surrounding the outermost container
   second thermocouple means contacting said middle and outermost containers for maintaining a zero temperature differential therebetween
   third thermocouple means contacting said middle and innermost containers for maintaining a constant temperature gradient therebetween
   constant power means controlled by said third thermocouple means for supplying power to said first heating element, and
   means for measuring the amount of power supplied to said first heating element.

5. A calorimeter system comprising:
   a calorimeter including a sample container and a heating enclosure for said sample container
   temperature sensing means for monitoring the temperature of said sample container
   an adiabatic enclosure for housing said calorimeter
   first temperature control means for maintaining a zero temperature differential between said adiabatic enclosure and said heating enclosure
   second temperature control means for maintaining a constant temperature gradient between said heating enclosure and said sample container
   constant power means for supplying power to said heating enclosure, and
   means for measuring the amount of power furnished to said heating enclosure.

6. A calorimeter system comprising:
   a calorimeter unit including a sample container and a calorimeter heater
   constant power means connected to said calorimeter heater
   temperature sensing means in said calorimeter unit for monitoring the temperature thereof
   first temperature control means in said calorimeter unit for sensing the temperature differential between said sample container and said calorimeter heater
   first electrical means connecting said first temperature control means and said calorimeter unit whereby a constant temperature gradient may be maintained between said sample container and said calorimeter heater by said constant power means
   an adiabatic enclosure for said calorimeter unit including an enclosure heater
   second temperature control means in said adiabatic enclosure for sensing the temperature differential between said enclosure and said calorimeter unit
   second electrical means connecting said second temperature control means and said enclosure heater whereby a zero temperature differential may be maintained between said calorimeter unit and said enclosure
   recording means connected to said temperature sensing means and said constant power means
   switch means connected between said constant power means and said recording means for activating said recording means when said constant power means is activated
   measuring means for electrically measuring the amount of power furnished to said sample container by said constant power means, and
   means connecting said measuring means to said recording means whereby a plot of the energy furnished to said sample container v. the time may be obtained.

References Cited by the Examiner

"Calorimeter With Automatic Control," article by Bullock, in the Journal of Scientific Instruments, vol. 36, January 1959, pp. 20–22.

"Adiabatic Calorimeter for Metals in the Range 50 to 1000° C.," article by Stansbury et al., in The Review of Scientific Instruments, vol. 30, No. 2, February 1959, pp. 121–126.

"Adiabatic Calorimeter for Small Samples," article by Tunnicliff et al., in The Review of Scientific Instruments, vol. 31, No. 9, September 1960, pp. 953–958.

RICHARD C. QUEISSER, *Primary Examiner.*

JACK C. GOLDSTEIN, *Assistant Examiner.*